(12) United States Patent
Spencer

(10) Patent No.: US 6,274,185 B1
(45) Date of Patent: *Aug. 14, 2001

(54) METHOD OF CONTROLLING BROWNING REACTIONS USING NOBLE GASES

(75) Inventor: Kevin C. Spencer, Hinsdale, IL (US)

(73) Assignee: American Air Liquide, Walnut Creek, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/169,542

(22) Filed: Dec. 20, 1993

Related U.S. Application Data

(63) Continuation of application No. 07/862,965, filed on Apr. 3, 1992, now abandoned.

(51) Int. Cl.[7] ............... A23B 1/30; A21D 4/00; A23C 3/00
(52) U.S. Cl. ............ 426/312; 426/317; 426/321; 426/330; 426/330.2; 426/330.3; 426/334; 426/262; 426/263
(58) Field of Search .................. 426/658, 654, 426/549, 580, 496, 498, 599, 262, 263, 312, 321, 330, 330.2, 330.3, 317, 334

(56) References Cited

U.S. PATENT DOCUMENTS

| | | |
|---|---|---|
| 2,569,217 | 9/1951 | Bagdigian . |
| 3,096,181 | 7/1963 | Dixon et al. . |
| 3,143,471 | 8/1964 | Coady . |
| 3,183,171 | 5/1965 | Schreiner . |
| 3,378,443 | 4/1968 | Cooper . |
| 3,677,024 | * 7/1972 | Segall .................. 426/524 |

(List continued on next page.)

FOREIGN PATENT DOCUMENTS

| | | |
|---|---|---|
| 989 311 | 5/1976 | (CA) . |
| 0635 601 | 9/1936 | (DE) . |
| 3 007 712 | 10/1981 | (DE) . |
| 3 446 829 | 7/1986 | (DE) . |
| 3 734 025 | 4/1989 | (DE) . |
| 0111 595 | 6/1984 | (EP) . |

(List continued on next page.)

OTHER PUBLICATIONS

Federation Proceedings, vol. 26, No. 2, Mar.–Apr. 1967, pp. 650, G.F. Doebbler, et al., "Inert Gas Interactions and Effects on Enzymatically Active Proteins".

Febs Letters, vol. 62, No. 3, Mar. 1976, pp. 284–287, K. Sandhoff, et al., "Effect of Xenon, Nitrous Oxide and Halothane on Membrane–Bound Sialidase From Calf Brain".

(List continued on next page.)

Primary Examiner—Anthony J. Weier
(74) Attorney, Agent, or Firm—Oblon, Spivak, McClelland, Maier & Neustadt, P.C.

(57) ABSTRACT

A method of controlling at least one browning reaction in a food, which entails effecting at least part of the reaction in the presence of at least one noble gas, a mixture of noble gases or a gaseous mixture containing at least one noble gas, thereby controlling the browning reaction.

10 Claims, 14 Drawing Sheets

THE MAILLARD REACTION

U.S. PATENT DOCUMENTS

| | | |
|---|---|---|
| 3,725,076 | 4/1973 | Stefanucci et al. |
| 3,957,892 | 5/1976 | Kleiman |
| 4,008,754 | 2/1977 | Kraushaar et al. |
| 4,017,363 | 4/1977 | McMullen et al. |
| 4,044,004 | 8/1977 | Saucy et al. |
| 4,136,049 | 1/1979 | Horiishi et al. |
| 4,138,565 | 2/1979 | Ehrhardt et al. |
| 4,308,264 | 12/1981 | Conway et al. |
| 4,314,810 | 2/1982 | Fourcadier et al. |
| 4,315,266 | 2/1982 | Ellis, Jr. |
| 4,450,960 | 5/1984 | Johnson |
| 4,496,397 | 1/1985 | Waite |
| 4,501,814 | 2/1985 | Schoenrock et al. |
| 4,548,605 | 10/1985 | Iwamoto et al. |
| 4,622,425 | 11/1986 | Gagne |
| 4,664,256 | 5/1987 | Halskov |
| 4,812,320 | 3/1989 | Ruzek |
| 4,830,858 | 5/1989 | Payne et al. |
| 4,892,579 | 1/1990 | Hazelton |
| 4,895,726 | 1/1990 | Curtet et al. |
| 4,895,729 | 1/1990 | Powrie et al. |
| 4,919,955 | 4/1990 | Mitchell |
| 4,946,326 | 8/1990 | Schvester et al. |
| 4,965,165 | 10/1990 | Saccocio et al. |
| 4,971,813 * | 11/1990 | Strobel et al. .............. 426/387 |
| 5,004,623 | 4/1991 | Giddey et al. |
| 5,006,222 | 4/1991 | Sequeria, Jr. |
| 5,021,251 * | 6/1991 | McKenna et al. .............. 426/330.5 |
| 5,030,778 | 7/1991 | Ransford |
| 5,045,529 | 9/1991 | Chiang |
| 5,064,070 | 11/1991 | Higashiyama |
| 5,108,656 | 4/1992 | Schvester et al. |
| 5,128,160 | 7/1992 | Fath et al. |

FOREIGN PATENT DOCUMENTS

| | | |
|---|---|---|
| 204 532 | 12/1986 | (EP) |
| 0 289 777 | 11/1988 | (EP) |
| 0 346 201 | 12/1989 | (EP) |
| 0346 201 | 12/1989 | (EP) |
| 0412 155 | 2/1991 | (EP) |
| 0440 273 | 8/1991 | (EP) |
| 1 339 669 | 9/1963 | (FR) |
| 1 454 653 | 8/1966 | (FR) |
| 2 013 177 | 3/1970 | (FR) |
| 2 089 899 | 1/1972 | (FR) |
| 2 133 502 | 12/1972 | (FR) |
| 2 156 559 | 6/1973 | (FR) |
| 2 225 095 | 11/1974 | (FR) |
| 2 261 518 | 9/1975 | (FR) |
| 2 406 567 | 5/1979 | (FR) |
| 2 643 232 | 8/1990 | (FR) |
| 0415 656 | 8/1934 | (GB) |
| 1 376 362 | 12/1974 | (GB) |
| 2 029 846 | 3/1980 | (GB) |
| 2 091 556 | 8/1982 | (GB) |
| 52-27699 | 9/1972 | (JP) |
| 52-86987 | 7/1977 | (JP) |
| 52-97913 | 8/1977 | (JP) |
| 54-129185 | 10/1979 | (JP) |
| 1-059647 | 1/1980 | (JP) |
| 58-39650 | 3/1983 | (JP) |
| 58-107180 | 6/1983 | (JP) |
| 60-56984 | 4/1985 | (JP) |
| 63-77848 | 4/1988 | (JP) |
| 2-104502 | 4/1990 | (JP) |
| 3-200568 | 9/1991 | (JP) |
| 1 289 437 | 2/1987 | (RU) |

OTHER PUBLICATIONS

Aviation, Space and Environmental Medicine, vol. 48, No. 1, Jan. 1977, pp. 40–43, S.K. Hemrick, et al., "Effect of Increased Pressures of Oxygen, Nitrogen, and Helium on Activity of a Na–K–Mg ATPase of Beef Brain".

Undersea Biomedical Research, vol. 17, No. 4, 1990, pp. 297–303, J.S. Colton, et al., "Effect of Helium and Heliox on Glutamate Decarboxylase Activity".

Sciences Des Aliments, vol. 4, No. 4, 1984, pp. 595–608, B. Pichard, et al., "Effect of Nitrogen, Carbon Monoxyde and Carbon Dioxyde on the Activity of Proteases of Pseudomonas Fragi and Streptomyces Caespitosus".

Chemical Abstracts, vol. 108, No. 9; abstract No. 74017f; see abstract & JP, A, 62 224 233 (Idemitsu Petrochemical Co. Ltd).

Database WPIL, Derwent Publications Ltd., London, GB; AN 85–181496; & JP, A, 60 110 663 (Kureha Chem. Ind. KK) see abstract.

Database WPI, Derwent Publications Ltd., London GB; AN 80–72434C & JP, A,55 111 755 (Kyodo Gas KK) Aug. 29, 1980 see abstract.

WPI Abstracts, AN–82–05785E, DE–3 202 622, Sep. 9, 1982.

Federation Proceedings, vol. 27, No. 3, May–Jun. 1968, H.R. Schreiner, "General Biological Effects of the Helium–Xenon Series of Elements".

156 Food Technology, vol. 34, No. 6, Jun. 1980, pp. 102.

Chemical Abstracts, vol. 106, No. 25, AN–210601e.

Chemical Abstracts, vol. 115, No. 20, AN–214644e.

WPI Abstracts, AN–70–84762R, DE–1753586.

Chemical Abstracts, vol. 97, No. 18, AN–145890c.

Chemical Abstracts, vol. 98, No. 10, AN–78191f.

Chemical Abstracts, vol. 99, No. 21, AN–172397v.

Chemical Abstracts, vol. 80, No. 7, AN–35579z.

Chemical Abstracts, vol. 80, No. 11, AN–56112g.

Chemical Abstracts, vol. 86, No. 3, AN–14672h.

Chemical Abstracts, vol. 68, No. 14, AN–60751j.

Chemical Abstracts, vol. 74, No. 23, AN–121276I.

Chemical Abstracts, vol. 76, No. 13, AN–70898s.

Chemical Abstracts, vol. 87, No. 22, AN–172800y.

Chemical Abstracts, vol. 91, No. 17, AN–138183x.

Chemical Abstracts, vol. 93, No. 24, AN–225670p.

Schweizerishche Milchwirtschaftlicheforschung, vol. 21, No. 1, 1992, pp. 6–11; Collumb et al. 'Optimisation des conditions d'entreposage des enchantillons de fromage en laboratoire à l'aide d'aide d'analyses chimiques'.

Database WPIL, Derwent Publications Ltd., London, GB: AN 85–181496 & JP, A, 60 110 663 (Daio KK) 11/88; cited in the application; see abstract.

Database WPI, Derwent Publications Ltd., London, GB; AN 77–73631 & JP,A, 52 105 232 (Teikoku Sanso KK) 9/77; cited in the application; see abstract.

Patent Abstract of Japan, vol. 8, No. 30 (c–209) 2/84; & JP,A,58 193 651 (Kawai Masao) 11/83 see abstract.

* cited by examiner

METHOD OF CONTROLLING BROWNING REACTIONS USING NOBLE GASES

This application is a Continuation of application Ser. No. 07/862,965, filed on Apr. 3, 1992, now abandoned.

BACKGROUND OF THE INVENTION

1. Field of the Invention

The present invention relates to a method for controlling browning reactions in foods using noble gases, or mixtures of noble gases or gaseous mixtures containing noble gases.

2. Description of the Background

The reaction of reducing sugars with amino acids is formally known as the Maillard reaction and is involved in the nonenzymatic browning of foods during cooking, processing and storage. This reaction is also generally known as the "browning" reaction. During cooking or other food processing, this reaction is often desired in order to impart favorable coloration to the final product, such as in the baking of bread or the caramelization of confections. In certain other food processing operations, which may or may not involve cooling or heating, the reaction is considered undesirable, such as in the storage of white sugar. Additionally, milk products are also susceptible to browning discoloration due to the Maillard reaction.

At present, methods of controlling browning reactions are limited to the control of process parameters, such as the amount of moisture or oxygen present in the atmosphere of the general process.

For example, in processing milk products, control of the Maillard reaction may be effected to some extent by maintaining control over reduction and oxidation potentials in the process media, by ensuring that unwanted amines or sugars are not added, by preventing unwanted reactions such as acidification of milk, by preventing contact with excess $CO_2$, and by controlling heating carefully. Typical process improvements are disclosed in WO 8600503, DE 3425088, AU 8546026, EP 189442 and DE 3448380, in which inert or non-reactive gases, either nitrogen or a noble gas, are used to control pressure in the system so as to provide a means whereby lower temperatures may be used or boiling may be prevented or aromas may be preserved.

However, the conventional methods of attenuating the Maillard reaction are inadequate as they are incapable of effecting a direct means of control. Furthermore, no means presently exists whereby the Maillard reaction can be both accelerated and retarded as needed.

Moreover, it would be extremely desirable if a means were available for directly controlling the Maillard reaction by using a particular atmospheric composition. At present, it is considered that gases generally have no effect on the Maillard reaction. Recently, Waller, G. R. and M. S. Fezther, 1983, ACS Symposium Series 215, The Maillard Reaction in Foods and Nutrition, American Chemical Society, Washington, D.C., USA, disclosed that no influence upon the course or rate of the Maillard reaction could be attributed to any atmospheric composition, except where a reactive gas, such as carbon dioxide, might react with a component of the reaction.

However, despite conventional wisdom, a need exists for a means by which browning reactions may be directly controlled as a function of atmospheric composition.

SUMMARY OF THE INVENTION

Accordingly, it is an object of the present invention to provide a method of controlling browning reactions in a food using a noble gas, a mixture of noble gases or a gaseous mixture containing at least one noble gas.

It is also an object of the present invention to provide a method for retarding browning reactions in a food using a noble gas, a mixture of noble gases or a gaseous mixture containing at least one noble gas.

Furthermore, it is also an object of the present invention to provide a method for accelerating browning reactions in a food using a noble gas, a mixture of noble gases or a gaseous mixture containing at least one noble gas.

The above objects and others which will become more apparent in view of the following disclosure are provided by a method for controlling at least one browning reaction in food, which entails conducting at least part of the reaction or reactions in the presence of a noble gas, a mixture of noble gases or a gaseous mixture containing at least one noble gas.

DETAILED DESCRIPTION OF THE PREFERRED EMBODIMENTS

Figure 1:
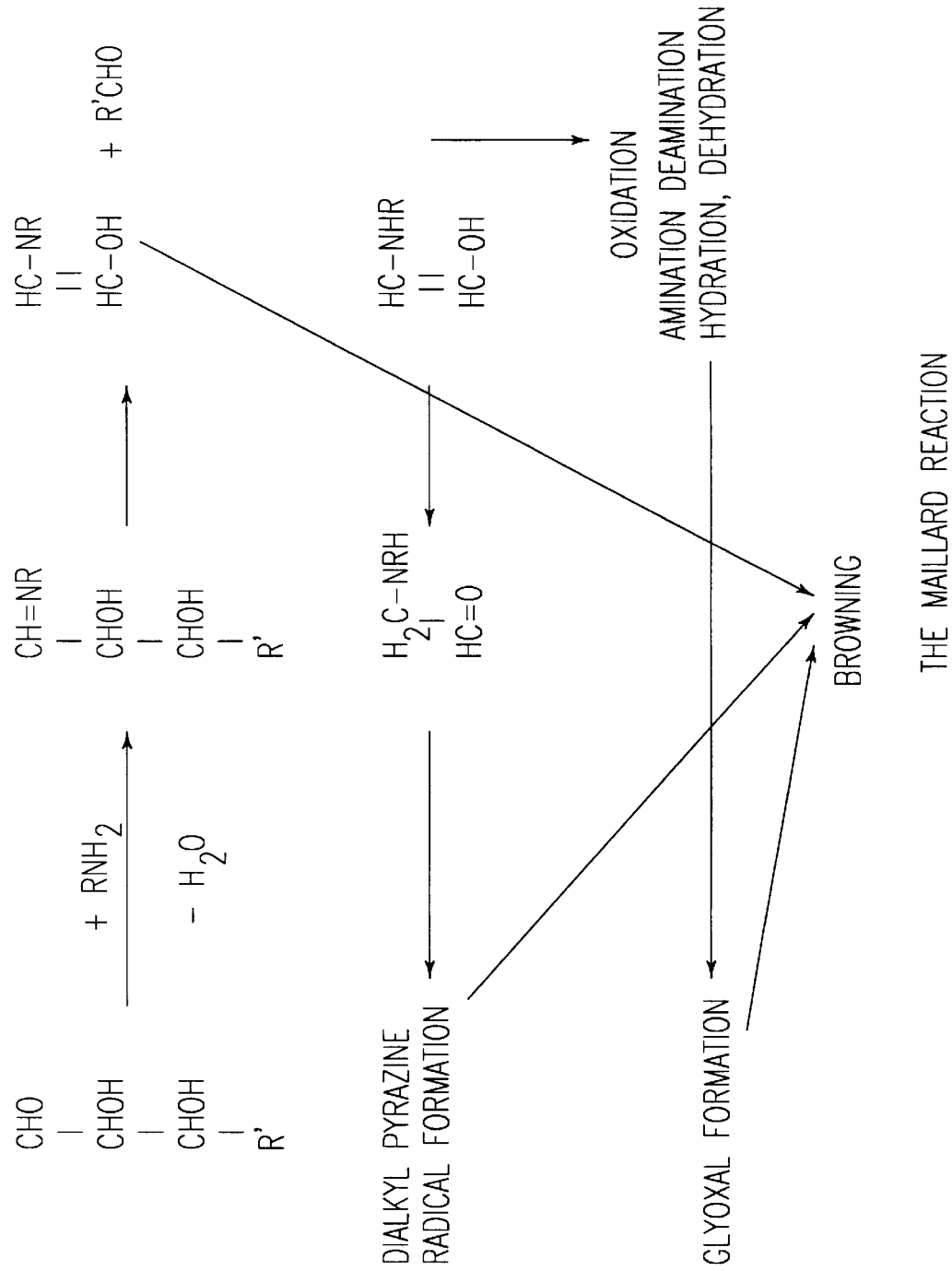
FIG. 1 illustrates the Maillard reaction sequence.

In accordance with the present invention, a means for controlling the course or rate of a browning reaction, in particular, the Maillard reaction, in foods is provided. In particular, in accordance with the present invention, a means is provided for controlling the course or rate of one or more browning reactions is provided in cooking processes in which the impartation of browning coloration is desired. The present invention also generally provides a method for controlling the course or the rate of such reactions in stored products where color change is not desired.

It is emphatically noted that the present invention may be used to control any browning reaction in the cooking of foods, however, it is particularly advantageous to use the present invention to control the Maillard reaction. The term "Maillard reaction" is used herein as defined in Walles et al noted above.

Also as used herein, the term "food" means any edible substances or compositions.

The present invention is generally predicated upon the surprising discovery that each of the noble gases influences the rate of progress of browning reactions.

Thus, in general, the present invention entails the use of a noble gas, a mixture of noble gases or a gaseous mixture containing at least one noble gas to control the rate of a browning reaction.

As used herein, the term "noble gases" is meant to include the gases argon, xenon, krypton, neon and helium. Although radon is a noble gas, it is not used as it is dangerously radioactive.

Furthermore, in accordance with the present invention, any one of the above noble gases, or combinations of the above noble gases or gaseous mixtures containing at least one of the above noble gases may be used. For example, any one of the above noble gases may be used in admixture with nitrogen.

Further, although the present invention generally utilizes the noble gas, mixture of noble gases or mixtures of gases containing at least one noble gas in gaseous form, the above gases may also be administered in the form of liquids. For example, in controlling a browning reaction in foods, such as sugar or baked goods, the gas or gas mixture may be administered in the form of a liquid to a cooking or storage means where the liquid is allowed to vaporize into gaseous form.

Further, it is specifically contemplated that liquid noble gases may be dissolved in other liquid gases such as nitrogen, for example, and used as such.

As noted above, mixtures of the above noble gases may be used. For example, excellent effects are observed when unpurified or semipurified source noble gas streams from air separation plants are used, such as about 1:1 He:Ne or about 90:10 Kr:Xe.

Generally, the present invention provides a direct means of controlling browning reactions in edible materials. Further, the present invention directly effects the rate of browning reactions, and each of the noble gases possesses different capabilities of influencing these reactions.

Thus, in accordance with the present invention, it has been discovered that a noble gas or noble gas-containing mixture may alter the rate of browning reactions.

Moreover, this effect is observed under conditions where the essential elements of a browning reaction exist, but where the reaction has not yet commenced.

The effect of the present invention can be enhanced by increasing the molar concentration of the effective gas in contact by increasing the pressure without limit, save for consideration of the state of the reacting materials or substrate.

In accordance with the present invention, it is also recognized that the presence of oxygen, carbon dioxide, hydrogen, ammonia, water, or any other reactive chemical can independently alter the course of browning reactions by well-understood chemical means. It is also understood that the course of the reaction is partially dependent upon existing oxidation/reduction potentials of the reaction milieu, and that these may be partially dependent upon the presence of oxygen or carbon dioxide or hydrogen or other oxidizing or reducing gases or chemicals.

In accordance with the present invention, the noble gas, mixture of noble gases or mixture containing at least one noble gas may in the form of a gas or liquid. For example, introduction of the noble gases or noble-gas containing mixtures as cryogenic liquid is an effective means of ensuring high titers of effective gas, particularly for storage of materials such as fine pharmaceuticals, proteins, and sugars, where addition of heat is not a required process step.

Also, excellent effects are observed in any mixture of noble gases, or in mixtures of noble gases with nitrogen, and excellent effects were observed when unpurified or semipurified source noble gas streams from air separation plants were used, such as about 1:1 He:Ne and about 90:10 Kr: Xe.

Helium generally accelerates browning reactions, but its use is constrained by the tendency to escape containment at elevated temperatures, due to its high permeability through polymers.

Both carbon dioxide and nitrous oxide generally inhibit browning reactions, but both cause many other oxidative effects, including induction of other types of browning, and are thus less practical.

Generally, the effect of the present invention may be obtained using a concentration of at least one noble gas which is greater than that found in atmospheric air. While it is recognized that the amount of noble gases in the atmosphere may vary with location, generally an amount of each of at least 0.1% by volume for gas and by weight for liquid are used. However, it is generally preferred to use an amount of each amount of each at least 10% by volume for gas and 10% by weight for liquid.

More preferably, at least about 50% by volume of noble gas is used for gases or at least about 50% by weight is used for liquids. It is, however, most preferred to use noble gas amounts of at least 90% by volume for gases and about 90% by weight for liquids, and better still to use noble gas amounts of at least 95% by volume for gases and about 95% by weight of liquids.

Further, the present invention generally utilizes a range of pressures from about near vacuum, i.e., $10^{-8}$ torr, to about 100 atmospheres. However, it is generally preferred that a pressure be used between about 0.001 to about 3 atmospheres. Further, the temperature generally used will be the temperature or range of temperature conventionally used for the cooking, baking and/or browning of food or in the case of general processing such as mixing, blending or storage of food components or final product foods, a temperature of about $-10°$ to about $80°$ C. may be used, preferably about $0°$ C. to about $40°$ C. However, lower or higher temperatures may be used as required in the general process of interest.

Having generally described the present invention, reference will now be made to certain examples which are provided solely for purposes of illustration and are not intended to be limitative.

EXAMPLE 1

Noble gases were assayed in all possible decile combinations pairwise and in triads, and examples tested of mixtures of 4 and 5 gases, and in every case the observed effect was approximately equal to the additive effect of the individual components corrected for change in relative concentration in the media.

Noble gases and mixtures of noble gases were assayed in decile combinations with nitrogen, and in every case the observed effect of the noble gases or mixtures of noble gases was the same as without nitrogen after correcting for the dilutory effect of nitrogen.

Noble gases and mixtures of noble gases were assayed in decile combinations with air, oxygen, nitrous oxide and carbon dioxide and found to exert effects identical to the additive effects of the gases, excepting that at higher concentrations the latter 4 reactive gases exerted effects independent of the Maillard reaction which masked the observed effect upon the Maillard reactions. These obscuring other effects and other reactions tend to limit the practical application of noble gases to those situations where nobel gases constitute 50% or more, preferably 95% or more, and most preferably 100% of the superimposed atmosphere.

In accordance with the present invention, is also understood that other reaction conditions, such as, for example, concentration of reactants, amount of water and other reactive chemicals present, pH, salt concentrations, competing reactions, other oxidation/reduction reactions, pressure and particularly temperature directly control the course of browning reactions.

Further, the observed influence of noble gases is at least partially independent of these other parameters, and is a unique and, heretofore, unknown property of the noble gases.

The noble gases exert effects which are different and independent of each other, and are additive when combined. These effects are also modified by reaction conditions, particularly by the concentration of the reactants in solution, and as a corollary, with the amount of water present.

It is observed that argon and other noble gases may increase the rate of the Maillard reaction up to 50% under certain conditions, and that inhibitions of 10–25% are often observed.

Having generally described the present invention, reference will now be made to certain examples which are provided solely for purposes of illustration and are not intended to be limitative.

Protocol

MAILLARD REACTION, A VISUAL EXPERIMENT

PURPOSE OF EXPERIMENT:

The purpose of this experiment is to follow the Maillard reaction for the specified systems at 25° C., 60° C. and 90° C. This is done both visually and spectrophotometrically using a Hunter Laboratories Mini-Scan 4500L Large Area View Spectrophotometer. The color change of interest is from a clear or starting color to bright yellow.

| SYSTEM | CONCENTRATIONS |
|---|---|
| Glucose/L-Lysine | 1000 mg:1000 mg:2 ml |
|  | 750 mg:750 mg:2 ml |
|  | 500 mg:500 mg:2 ml |
|  | 250 mg:250 mg:2 ml |
| Glucose/Glycine | 450 mg:450 mg:2 ml |
|  | 338 mg:338 mg:2 ml |
|  | 225 mg:225 mg:2 ml |
|  | 57 mg:57 mg:2 ml |
| Glucose/Albumin | 1000 mg:1000 mg:2 ml |
|  | 750 mg:750 mg:2 ml |
|  | 500 mg:500 mg:2 ml |
|  | 250 mg:250 mg:2 ml |

GASES: Air
 Oxygen
 Krypton
 Xenon
 Nitrogen
 Neon
 Argon

TEMPERATURE: 25° C.
 60° C.
 90° C.

GASSING: 10 ml serum vials containing 2 ml of solution are gassed 6×30 cc with the appropriate gas. Vials were then refrigerated for 24 hrs to properly saturate the solutions with gas.

HEATING APPARATUS:
 25° C. is as room temperature
 60° C. is maintained using a Lab-Line Orbit Environ-Shaker set at 60° C. and 900 rpm.
 90° C. is maintained using a Precision Shaking Water Bath 25 set at 91.0 and a shaker speed of 75/min.

Color Code for Visual Readings:

| NUMERICAL REPRESENTATION | VISUAL COLOR |
|---|---|
| 1 | clear and/or colorless |
| 2 | very very pale yellow |
| 3 | very pale yellow |
| 4 | pale yellow |
| 5 | yellow |
| 6 | pale orange |
| 7 | orange |
| 8 | pale brown |
| 9 | brown (light caramel) |
| 10 | very brown (amber) |
| 11 | brown (appears black from distance) |

Note: colors 6–11 are included for studies where the vials were tracked through the entire color change.

Hunter Lab Color Scale for Visual Readings

A Hunter Laboratories Miniscan 4500L wide area view spectrocolormeter was used to confirm the above readings. Generally, a Hunter L value of 0 represented a completed Maillard reaction (dark brown or black color and opaque), and a Hunter L value of 100 indicated the initial unreacted starting state for the reaction solution (color is clear or transparent). Thus the above scale may be translated to and from Hunter L values as:

| Visual Scale: | Hunter L Scale: |
|---|---|
| 1 | 0 |
| 2 | 10 |
| 3 | 20 |
| 4 | 30 |
| 5 | 40 |
| 6 | 50 |
| 7 | 60 |
| 8 | 70 |
| 9 | 80 |
| 10 | 90 |
| 11 | 100 |

As a matter of practicality, both because of the large number of samples run and because of the undesirability of removing samples from temperature-controlled baths and incubators to take Hunter calorimeter readings, most readings were made visually with frequent sampling to confirm these readings being additionally taken using the Hunter colorimeter.

SOLUTION PREPARATION:
 Soln A: Glucose/L-Lysine (1000 mg : 1000 mg : 2 ml)
  Dissolve 25.0 g each of glucose and L-Lysine in 50 ml D.I. $H_2O$.

Soln B: Glucose/L-Lysine (750 mg : 750 mg : 2 ml)
Dissolve 18.8 g each of glucose and L-Lysine in 50 ml D.I. $H_2O$.

Soln C: Glucose/L-Lysine (500 mg : 500 mg : 2 ml)
Dissolve 12.5 g each of glucose and L-Lysine in 50 ml D.I. $H_2O$.

Soln D: Glucose/L-Lysine (250 mg : 250 mg : 2 ml)
Dissolve 6.3 g each of glucose and L-Lysine in 50 ml D.I. $H_2O$.

Soln E: Glucose/Glycine (450 mg : 450 mg : 2 ml)
Dissolve 11.3 g each of glucose and Glycine in 50 ml D.I. $H_2O$.

Soln F: Glucose/Glycine (338 mg : 338 mg : 2 ml)
Dissolve 8.5 g each of glucose and Glycine in 50 ml D.I. $H_2O$.

Soln G: Glucose/Glycine (225 mg : 225 mg : 2 ml)
Dissolve 5.7 g each of glucose and Glycine in 50 ml D.I. $H_2O$.

Soln H: Glucose/Glycine (57 mg : 57 mg : 2 ml) Dissolve 2.9 g each of glucose and Glycine in 50 ml D.I. $H_2O$.

Soln I: Glucose/Albumin (1000 mg : 1000 mg : 2 ml)
Dissolve 25.0 g each of glucose and Albumin in 50 ml D.I. $H_2O$.

Soln J: Glucose/Albumin (750 mg : 750 mg : 2 ml)
Dissolve 18.8 g each of glucose and Albumin in 50 ml D.I. $H_2O$.

Soln K: Glucose/Albumin (500 mg : 500 mg : 2 ml)
Dissolve 12.5 g each of glucose and Albumin in 50 ml D.I. $H_2O$.

Soln L: Glucose/Albumin (250 mg : 250 mg : 2 ml)
Dissolve 6.3 g each of glucose and Albumin in 50 ml D.I. $H_2O$.

Note: All solutions were refrigerated in glass amber bottles to prevent browning.

MAILLARD REACTION, A UV/VIS EXPERIMENT
PURPOSE OF EXPERIMENT:

The purpose of this experiment is to take continuous full range scans of a sugar/amino acid system to follow the Maillard reaction for the specified system at 60° C. Full Range Scans are needed as the color change is from:

clear==>yellow ==>orange ==>brown with many intermediary colors. Because the wavelength at which the cuvette should be read is continually changing we will use full range scans to follow the reaction.

SYSTEM: Glucose/$_L$-Lysine
CONCENTRATIONS: 100 mg : 100 mg/2 ml D.I. $H_2O$
 10 mg : 10 mg/2 ml D.I. $H_2O$
 1 mg : 1 mg/2 ml D.I. $H_2O$
GASES: Air
 Oxygen
 Krypton
 Xenon
 Nitrogen
 Neon
 Argon
TEMPERATURE: 60° C.
READINGS: Full Range Scan, 900–190 nm
 number of cycles: 30
 cycle time: 900
 Note: the length of time for each scan is approx. 109 sec.
MATERIALS: acrylic cuvettes w/blue silicone plugs: gas tight
 10cc syringes GASSING: Cuvettes containing 2.5 ml of soln will be gassed 10×10cc with the appropriate gas. Cuvettes were refrigerated for 15 min. to ensure saturation with the gas.

SOLUTION PREP: Soln 1: (100 mg : 100 2g/2 ml D.I. $H_2O$)

Dissolve 2 gram each of Glucose and $_L$-Lysine in 40 ml D.I. $H_2O$.
 Soln 2: (10 mg : 10 mg/2 ml D.I. $H_2O$) Dilute 4 ml Soln 1 to 40 ml using D.I. $H_2O$
 Soln 3: (1 mg : 1 mg/2 ml D.I. $H_2O$)
Dilute 4 ml Soln 2 to 40 ml using D.I. $H_2O$
Spectrophotometer Study:
 Perkin-Elmer Lambda 6 UV/VIS Spectrophotometer
 Full Range Scan 900–190 nm
 No. of cycles 30
 Cycle time: 900 s
 Digital controller: 60° C.
 Reference Cell: 2.5 ml D.I. $H_2O$ The present invention will now be further demonstrated by reference to certain illustrative but non-limitative examples.

EXAMPLE 2

Approximately 250 g. of pizza dough and bread dough made from conventional ingredients such as yeast, flour, salt and sugar was prepared and each separated into nine samples each.

Each was placed into a one-liter gas tight glass mason jar, having a gas-controlled atmospheric chamber. Each of the following gases were tested using atmosphere pressure at room temperature, which pressure, of course, increased with temperature. The pizza dough samples were heated at 375° F. for about 30 minutes, while the bread dough samples were heated at 350° F. for about 30 minutes.

Gases tested: $O_2$, $CO_2$, $N_2$, Ar, Xe, Kr, Ne, He, $N_2O$ and air.

Result: Generally, it was observed that the time required for browning measured about 25% faster for noble gases as compared to air, $CO_2$ and $N_2O$, while inhibition of browning relative to air is observed with $O_2$.

FIGS. 1–14 will now be described in further detail.

FIG. 1 shows the Maillard reaction sequence. This reaction involves the heat-driven reaction of a sugar with an amine to produce a complex which can undergo further reactions, such as a reverse-aldol condensation, to produce colored products. This reaction is often responsible for the browning of foods which occurs during cooking.

Figure 2:
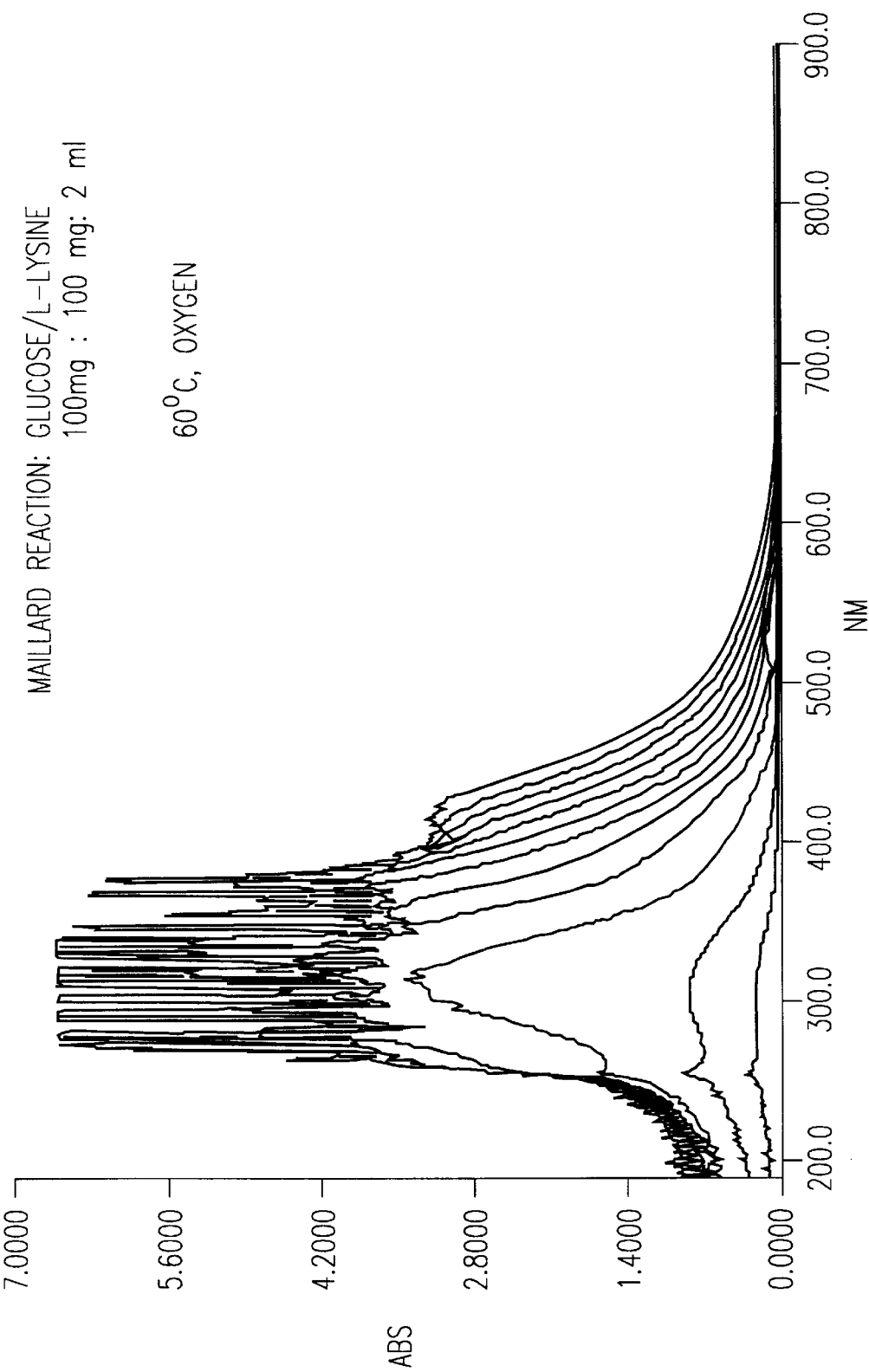
FIG. 2 illustrates a full-scale UV/VIS scans taken during the progress of the Maillard reaction at 60° C. with glucose and lysine as reactants under an oxygen atmosphere.

FIG. 2 depicts full-scale uv/vis scans taken during the progress of the Maillard reaction at 60° C. with glucose and lysine as reactants, when the atmosphere is maintained as oxygen. Progress of the reaction is followed as increasing absorbance full-scale.

Figure 3:
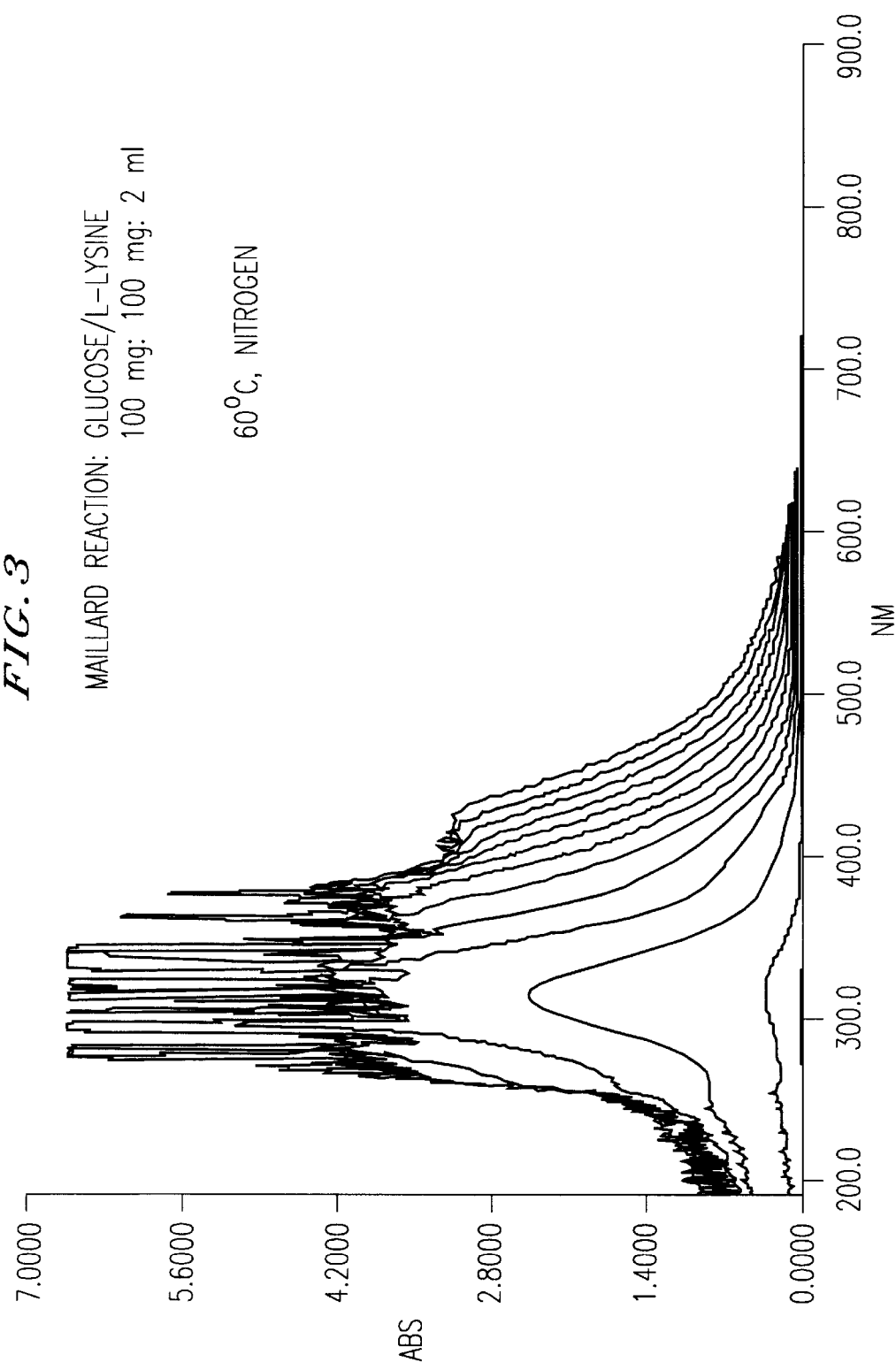
FIG. 3 illustrates an identical reaction run under a nitrogen atmosphere.

FIG. 3 depicts an identical reaction run under a nitrogen atmosphere. Note that the reaction is very slightly retarded when run under nitrogen as opposed to oxygen.

Figure 4:
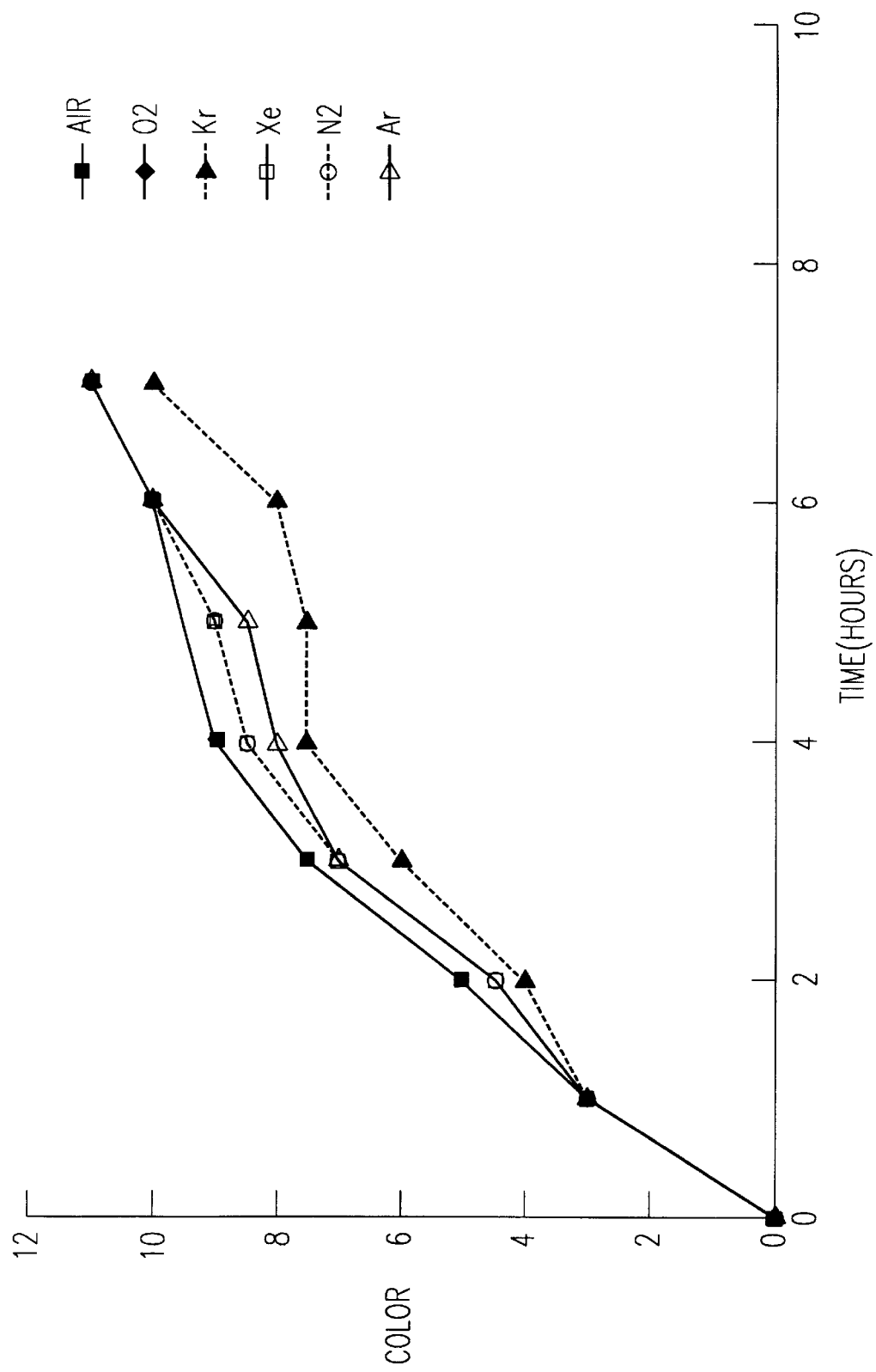
FIG. 4 illustrates the progress of the Maillard reaction at 90° C. using as reactants 500 mg each of glucose and lysine and 2 ml of water under seven different atmospheres.

FIG. 4 shows the progress of the Maillard reaction at 90° C. using as reactants 500 mg each of glucose and lysine in 2 ml of water, under 7 different atmospheres. Krypton retards the reaction by about 20% and argon by about 10% compared to air. In this experiment, the rate of reaction is seen to be Air=$O_2$>Xe=Ne=$N_2$>Ar>Kr.

Figure 5:
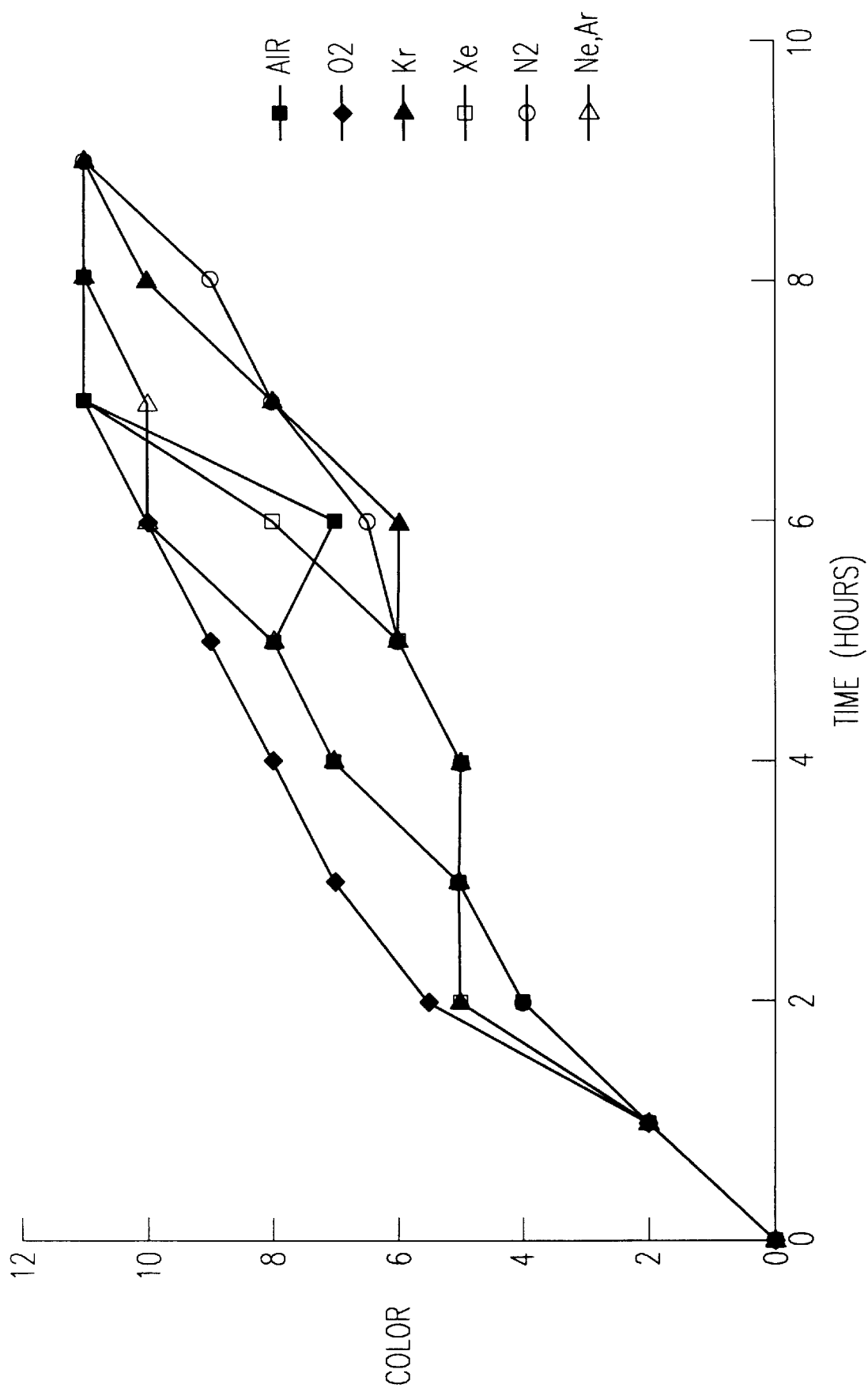
FIG. 5 affords a replicate of the experiment of FIG. 4, using half the reactant concentration.

FIG. 5 is a replicate of the experiment of FIG. 4, using half the reactant concentration. Note that further differentiation of the retardative effects of the various gases occurs as reactant concentration is lowered. In this case, $O_2$>Ne>=air>Xe>Ar>$N_2$>Kr.

Figure 6:
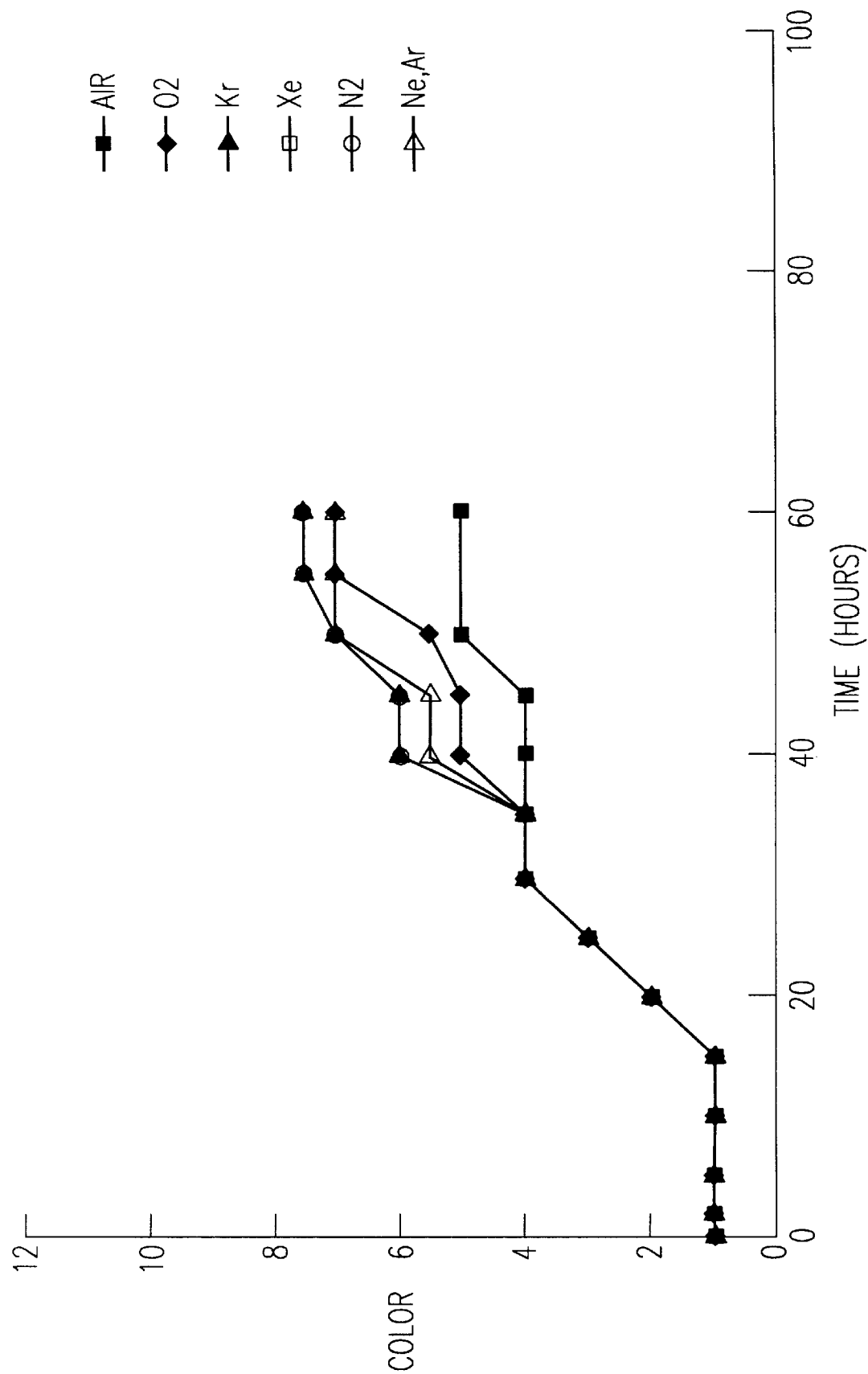
FIG. 6 illustrates the differential effects of noble gases on the Maillard reaction at 90° C. using 338 mg each of glucose and glycine and 2 ml of water.

FIG. 6 demonstrates the differential effects of noble gases upon the Maillard reaction at 90° C. using 338 mg each of glucose and glycine in 2 ml of water. In this case, air and oxygen retard the reaction, and nitrogen, krypton, and xenon accelerate the reaction. $N_2=Xe=Kr>Ar=Ne>O_2>air$.

Figure 7:
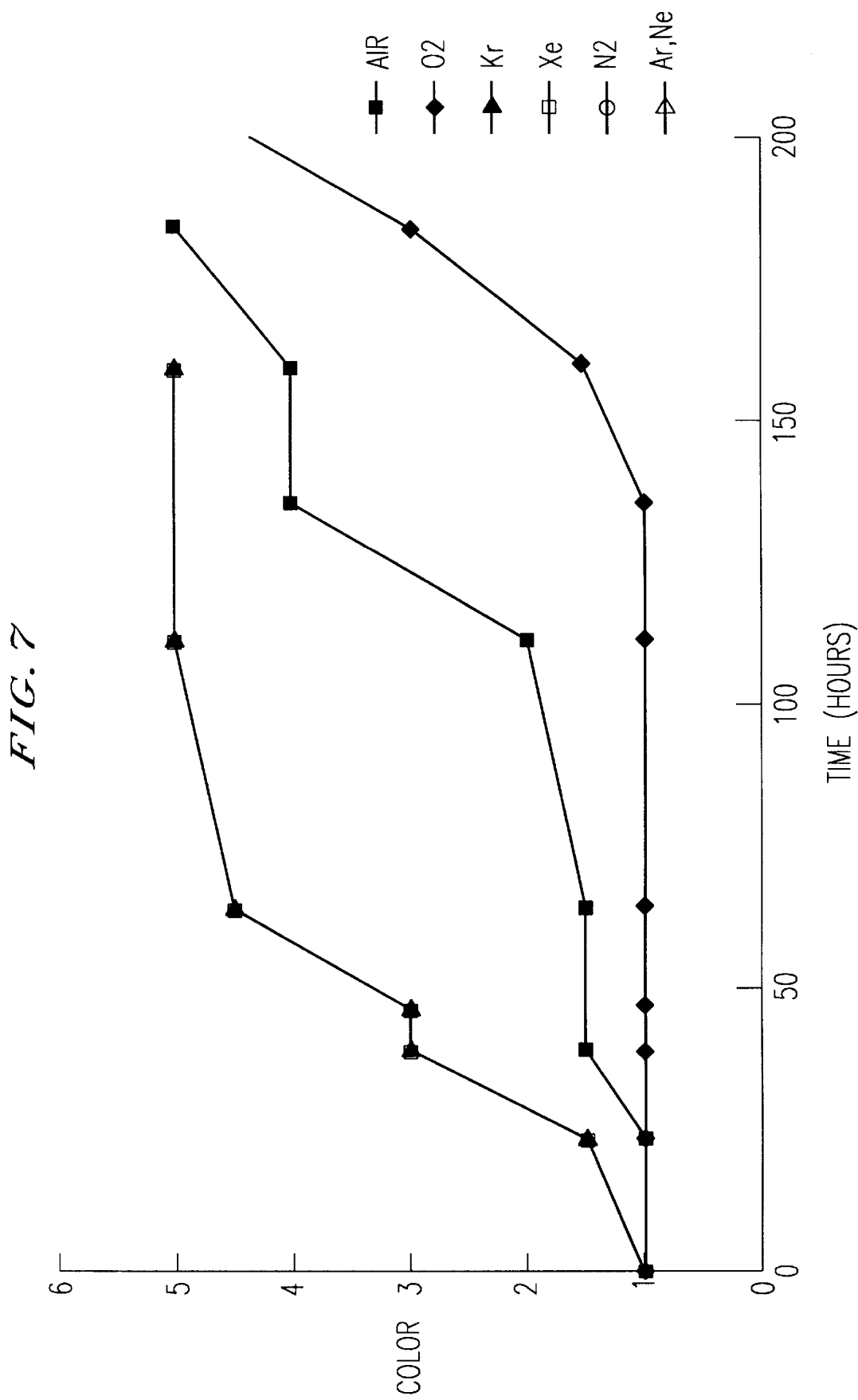
FIG. 7 illustrates that nitrogen and the noble gases greatly accelerate the Maillard reaction using 250 mg each of glucose and lysine at 25° C. in comparison with air or oxygen.

FIG. 7 shows that nitrogen and the noble gases much accelerate the progress of the Maillard reaction using 250 mg each of glucose and lysine at 25° C. in comparison with air or oxygen. The same was found for this reaction when run at concentrations up to 1000 mg of each reactant.

Figure 8:
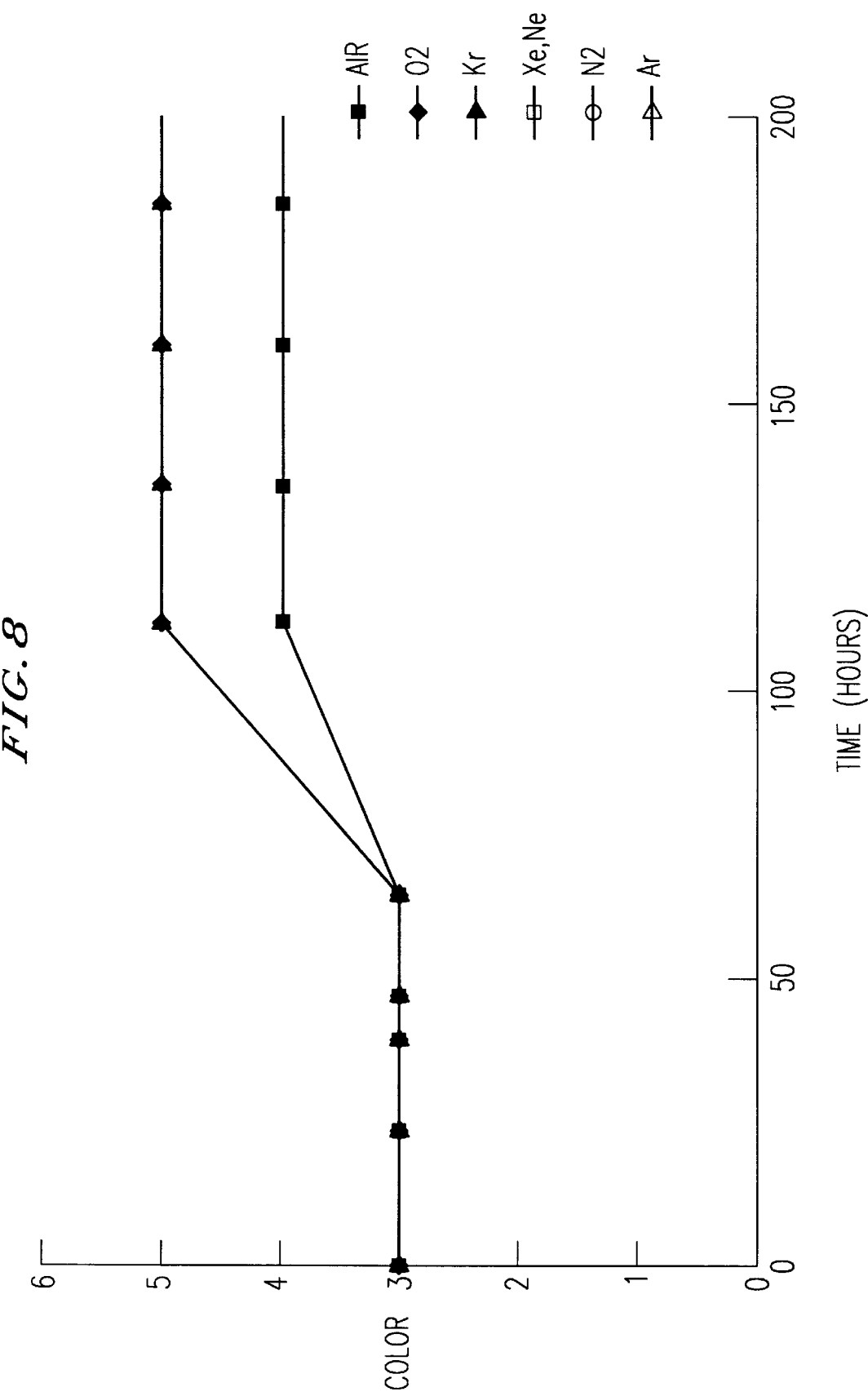
FIG. 8 illustrates the course of the Maillard reaction using 1,000 mg each of glucose and albumin and 2 ml of water at 25° C.

FIG. 8 depicts the course of the Maillard reaction using 1000 mg each of glucose and albumin in 2 ml of water at 25° C. The reaction proceeds much faster under argon, krypton and nitrogen than under oxygen, xenon or neon.

Figure 9:
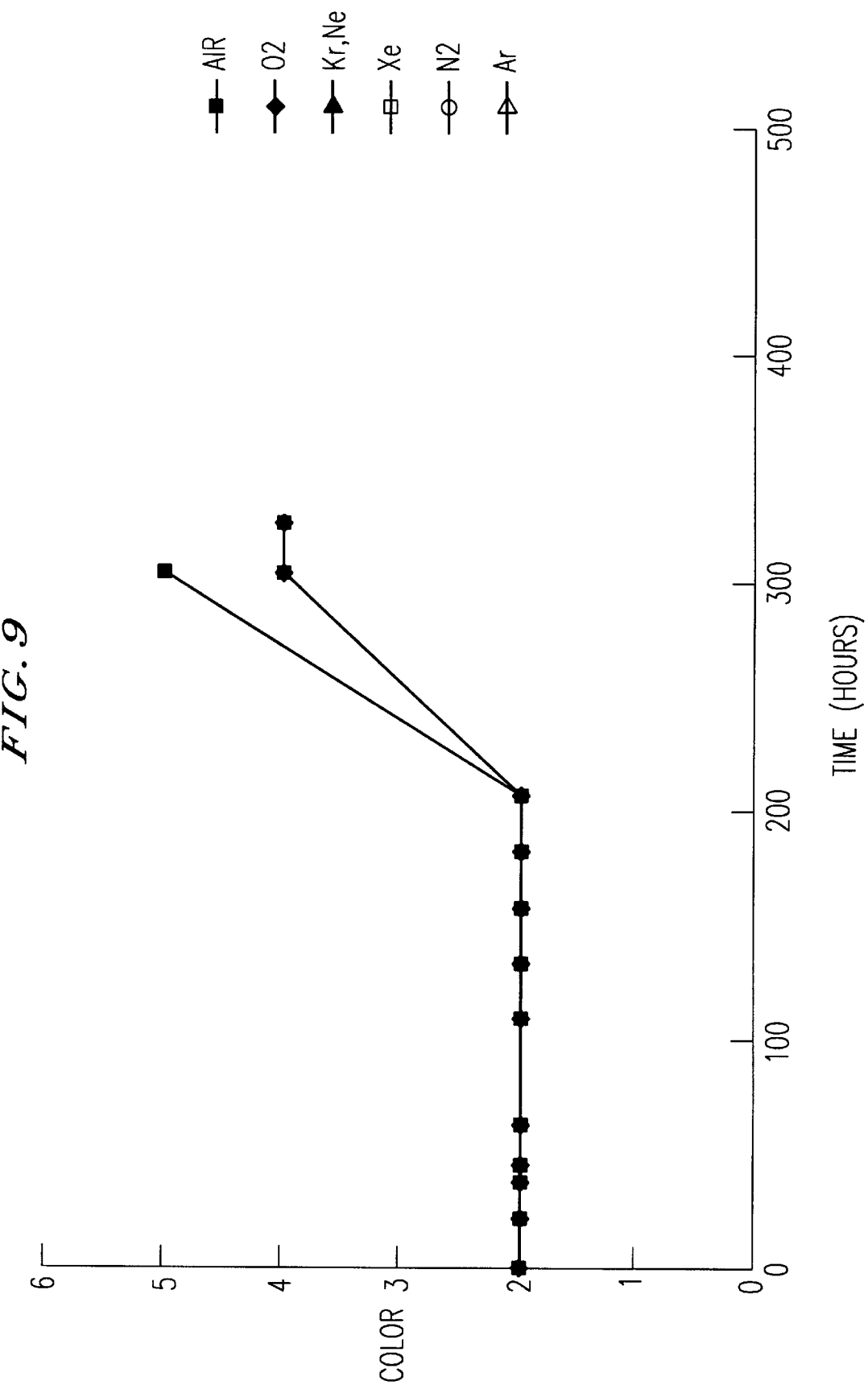
FIG. 9 illustrates the same reaction conducted using one-quarter of the above concentrations.

FIG. 9 shows the same reaction conducted using one-quarter of the above concentrations. The reaction proceeds better under krypton and neon than under the other gases.

Figure 10:
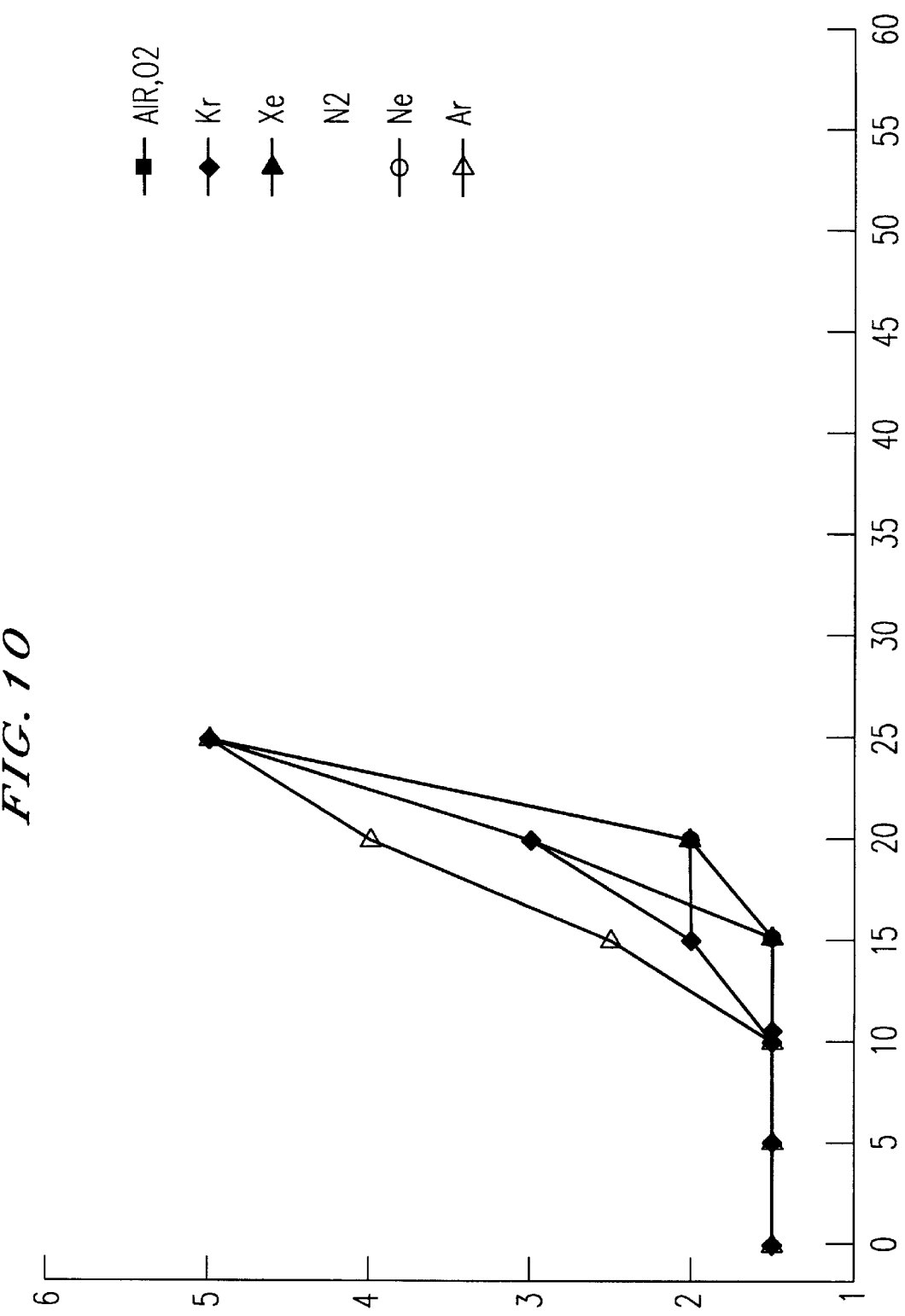
FIG. 10 illustrates the progress of the Maillard reaction between 750 mg each of glucose and lysine and 2 ml of water at 60° C.

FIG. 10 depicts the progress of the Maillard reaction between 750 mg each of glucose and lysine in 2 ml of water at 60° C. Argon is seen to accelerate the reaction by about 25%, whereas krypton retards the reaction by about 15% with respect to air. The observed order of apparent rate is $Ar>N_2>air=O_2=Ne>Xe>Kr$.

Figure 11:
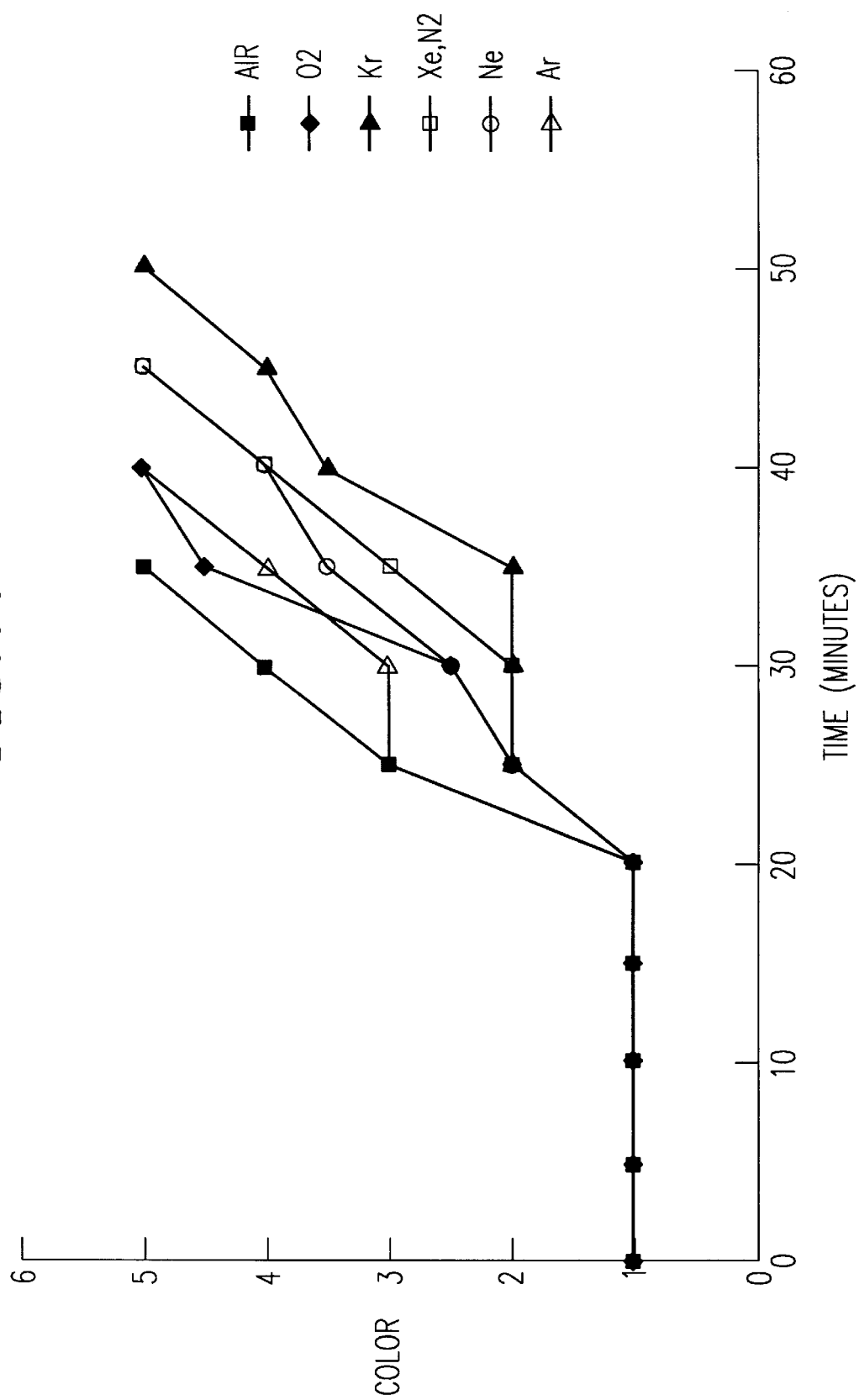
FIG. 11 is a replicate of the above reaction run at one-half concentration.

FIG. 11 is a replicate of the above reaction run at one-half concentration. Here the rate order is $air>Ar>=O_2>Ne>Xe=N_2>Kr$.

Figure 12:
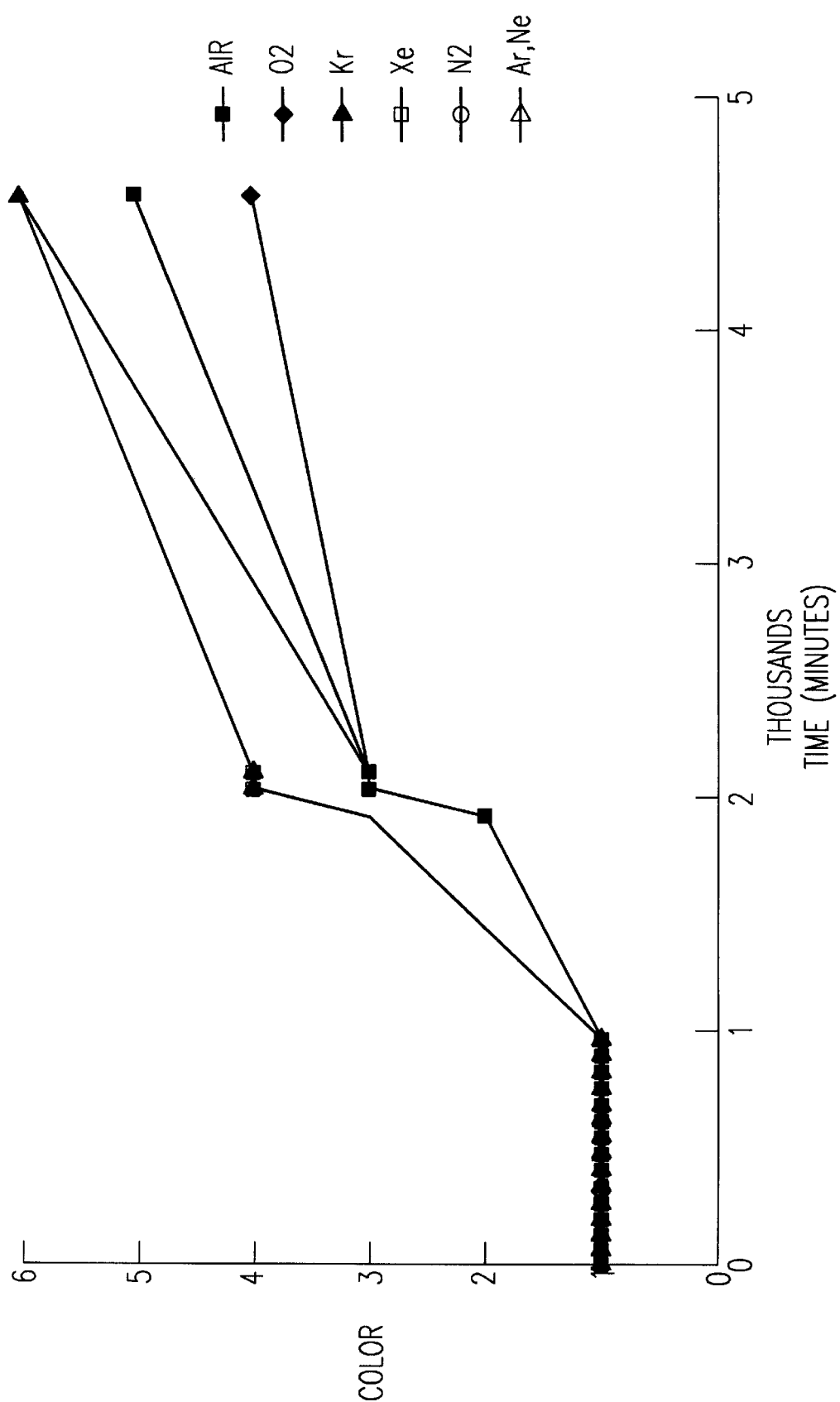
FIG. 12 illustrates that the Maillard reaction run at relatively low concentrations between glucose and lysine at 60° C. proceeds more slowly under oxygen or air, and is accelerated by xenon, and is accelerated further by argon, krypton, neon or nitrogen.

FIG. 12 demonstrates that the Maillard reaction run at relatively low concentrations (57 mg/ml) between glucose and lysine at 60° C. proceeds most slowly under oxygen or air, and is accelerated by xenon, and is accelerated further by argon, krypton, neon or nitrogen. The observed rate order is $Ar=N_2=Kr=Ne>xe>air>O_2$. The degree of acceleration compared to air ranges from 25–50% at other concentrations.

Figure 13:
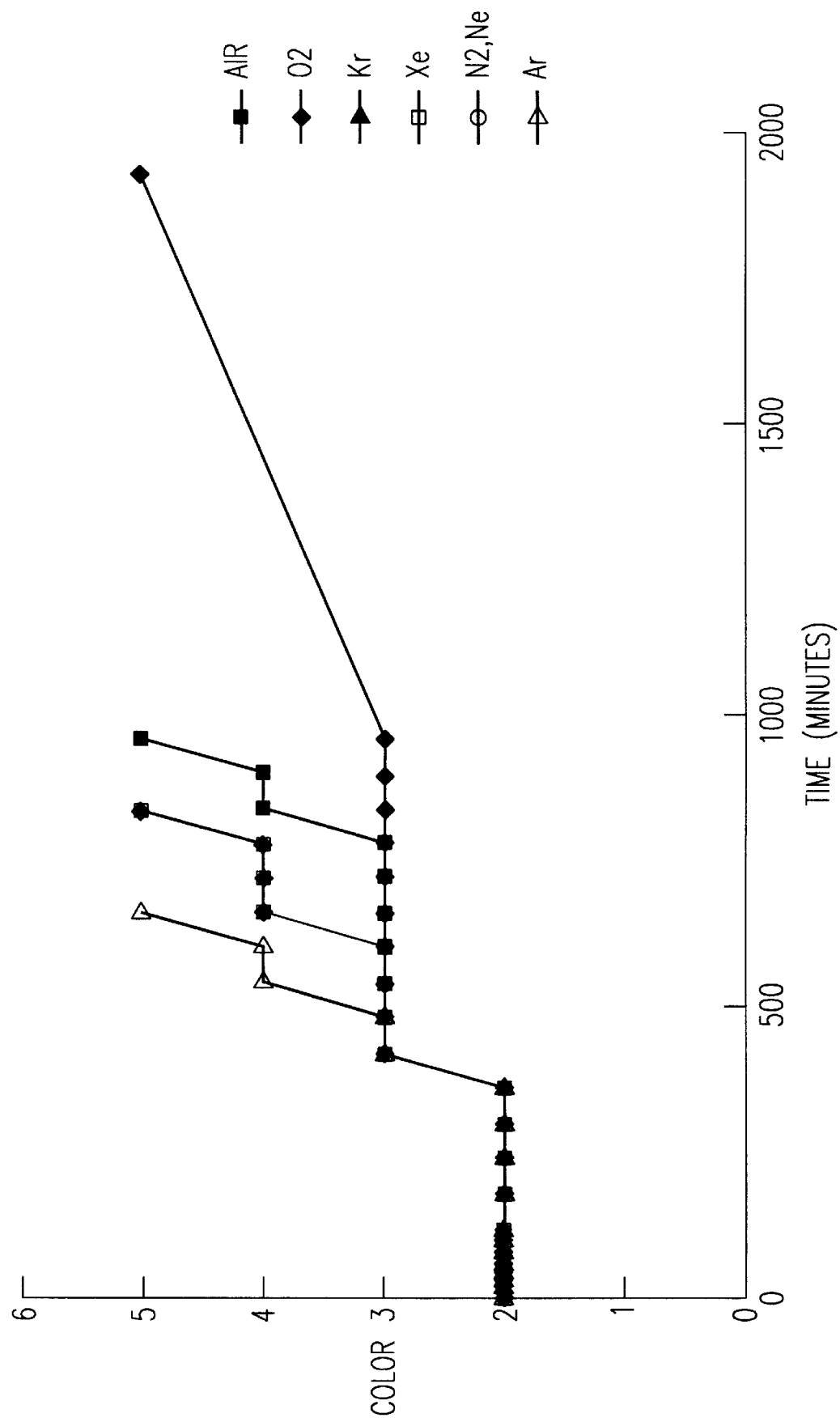
FIG. 13 illustrates that the Maillard reaction between glucose and albumin at 60° C. at a concentration of 250 mg each in 2 ml of water proceeds optimally under an argon atmosphere, and is most poorly under air or oxygen.

FIG. 13 shows the Maillard reaction between glucose and albumin at 60° C. at a concentration of 250 mg each in 2 ml of water proceeds optimally under an argon atmosphere, and most poorly under air or oxygen. The rate order observed is $Ar>Xe=Kr=Ne=N_2>air>O_2$. This is found to be true for other concentrations from 1–1000 mg/ml each reactant.

Figure 14:
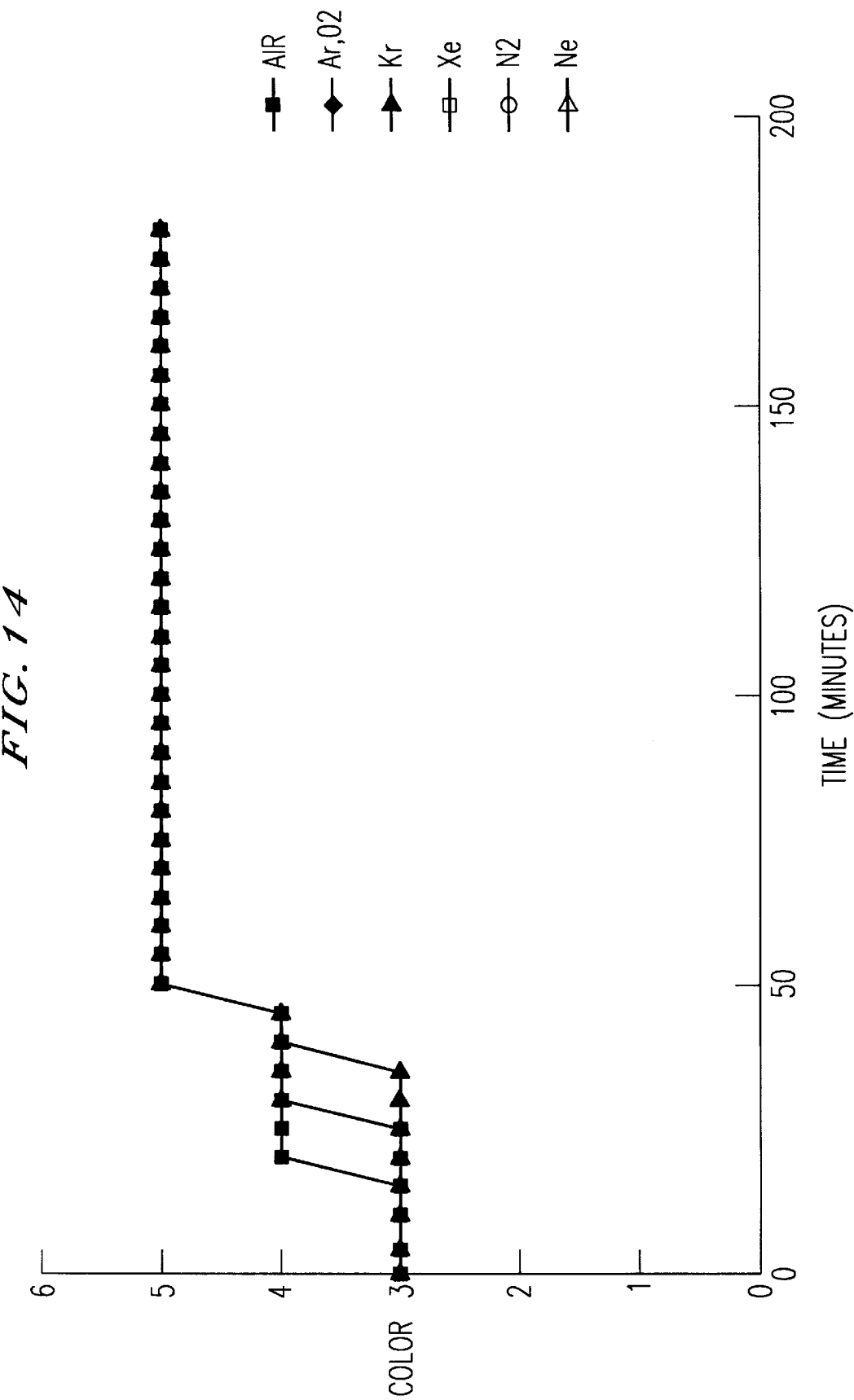
FIG. 14 illustrates a reaction order of $Ar=Xe=Kr>N_2=air>Ne$ for the Maillard reaction between glucose and albumin at 1,000 mg each and 2 ml of water at 60° C., where the temperature is raised from 20–60° C. over a one hour period.

FIG. 14 shows a reaction order of $Ar=Xe=Kr>N_2=air>Ne$ for the Maillard reaction between glucose and albumin at 1000 mg each in 2 ml of water at 60°, where the temperature was raised from 20–60° C. over a 1 hr period. Greater differentiation in effect between the gases is seen compared with FIG. 12.

In accordance with the present invention any food may be treated so as to control browning reactions therein. Further, it is to be understood that the present invention may be applied to an entire browning reaction sequence or to only a part of that sequence in order to achieve a desired effect. For example, if it is desired to cook a food with minimal browning, the first portion of the cooking sequence may be conducted with the food in contact with a noble gas, mixture of noble gases or gaseous mixture containing at least one noble gas with the purpose of inhibiting browning. By contrast, if it is described to cook the material of composition with maximum browning, the process may be conducted with the purpose of enhancing browning.

The present invention is of particular advantage in the baking of breads, pies and cakes with enhanced browning, for example, or in the storage of foods which are subject to browning in storage, such as milk or sugar, with inhibited browning.

Generally, in accordance with the present invention, the effect of the noble gases in accordance with the present invention is additive. Further, the noble gases may be used as gases, as gas-containing solutions, as liquids or as liquid-containing liquids. Thus, the gases or liquids may be a noble gas, a mixture of noble gases or mixture containing at least one noble gas.

Thus, single noble gases may be used, or binary mixtures, such as argon-neon, argon-krypton or krypton-xenon may be used. Also, ternary mixtures, such as argon-neon-krypton or krypton-xenon-neon may be used. Further, if liquids are used, the noble gas or gases may be used neat or dissolved in another liquid such as liquid nitrogen.

Generally, in the mixtures of two or more noble gases, each noble gas is contained in the amount of about 0.01 volume % to about 99.99 volume % based on the total volume.

Moreover, one or more carrier gases may be used in admixture with the one or more noble gases. For example, carrier gases such as oxygen, nitrogen, carbon dioxide, nitrous oxide, hydrogen and helium may be noted. Moreover, helium may be used not only as a "noble gas", but also as a "carrier gas".

Further, in accordance with the present invention, it is noted that carrier gases such as oxygen, carbon dioxide and nitrous oxide can be reactive and mask the effect of the noble gases. Thus, when such gases are used as carrier gases, an amount of noble gas must be used sufficient for the effect thereof to outweigh the masking effect of the carrier gas.

Thus, the present invention is generally used to control at least one browning reaction, preferably the Maillard reaction. Generally, the present invention is used to advantage in accelerating such reactions in baked goods such as pies, cakes, cookies, donuts, bread of all types and even pretzels, and in inhibiting reactions in sugars and milk, for example.

Having now described the present invention, it will now be apparent to one of ordinary skill in the art that many changes and modifications can be made without departing from the spirit and scope of the present invention.

What is claimed as new and desired to be Secured by Letters Patent of the United States is:

1. A method of increasing a rate of a browning reaction in food during heating thereof to produce a baked good, which comprises heating said food under an atmosphere consisting essentially of argon, neon, krypton or xenon or a mixture thereof at a pressure of up to about 3 atm.

2. The method of claim 1, wherein said browning reaction occurs during cooking or baking of said baked good.

3. The method of claim 1, wherein said browning reaction is a Maillard reaction.

4. The method of claim 1, wherein said atmosphere contains at least 95 percent by volume of noble gas.

5. The method of claim 1, wherein said atmosphere is present at a pressure of from about 0.001 to about 3 atmospheres.

6. The method of claim 1, wherein said browning reaction is effected at any temperature used for cooking, baking or browning of baked good.

7. The method of claim 1, wherein said atmosphere is about 1:1/helium:neon or about 90:10/krypton:xenon by volume percent.

8. The method of claim 1, wherein said atmosphere further contains a carrier gas selected from the group consisting of air, oxygen, carbon dioxide, nitrogen, nitrous oxide and mixtures thereof.

9. The method of claim 1, wherein said atmosphere is in gaseous form.

10. The method of claim 1, wherein said atmosphere is in liquid form, and then subsequently vaporized.

* * * * *